United States Patent [19]
Taube et al.

[11] Patent Number: 5,913,328
[45] Date of Patent: Jun. 22, 1999

[54] FLOW CONTROL VALVE WITH ONE PIECE PLUG/VALVE TUBE SLEEVE ASSEMBLY

[76] Inventors: John D. Taube; Peter H. Greverath; Eric Geile, all of 1363 Anderson, Clawson, Mich. 48017

[21] Appl. No.: 08/929,504

[22] Filed: Sep. 15, 1997

[51] Int. Cl.⁶ .................................................... G05D 7/01
[52] U.S. Cl. ............................................ 137/315; 137/501
[58] Field of Search .................................. 137/501, 504, 137/315; 251/340

[56] References Cited

U.S. PATENT DOCUMENTS

| | | | |
|---|---|---|---|
| 2,800,141 | 7/1957 | Hedland | 137/504 |
| 3,064,676 | 11/1962 | Baker | 137/501 |
| 3,223,115 | 12/1965 | Kates | 137/501 |
| 3,643,685 | 2/1972 | Hays | 137/340 X |
| 4,768,540 | 9/1988 | Mochizuki et al. | 137/501 X |

*Primary Examiner*—Stephen M. Hepperle
*Attorney, Agent, or Firm*—Charles W. Chandler

[57] ABSTRACT

A fluid flow control valve having a plug opening with a plug having a central passage for discharging fluid from the controller. The plug opening has a smaller cylindrical guide surface, threaded for engaging the plug, and a larger cylindrical guide surface. The plug has similarly shaped surfaces for engaging the guide surfaces of the plug opening to precisely locate the plug with respect to an impeller chamber.

8 Claims, 2 Drawing Sheets

FLOW CONTROL VALVE WITH ONE PIECE PLUG/VALVE TUBE SLEEVE ASSEMBLY

BACKGROUND OF THE INVENTION

This invention is related to an automatic flow rate controller which employs a pressure differential impeller to automatically maintain a constant flow rate to a controlled part, despite variations in fluid pressure, and more particularly to such a controller having a minimal number of components.

Typical controllers include an impeller, a retaining washer, a lock nut, a screw, an end cap, a spring, a valve sleeve, and a valve tube. A fixed but adjustable orifice creates the differential pressure across the impeller to maintain a constant flow output. The impeller reciprocates with a valve sleeve driven by a force balance between a fluid pressure differential across the impeller and a spring force. The impeller moves axially with the valve sleeve to open or close valve ports in the valve tube. In a typical controller, the impeller and the valve sleeve are separate components.

SUMMARY OF THE INVENTION

The broad purpose of the present invention is to provide an improved fluid flow rate controller of the type in which a sleeve is slidably mounted on a valve tube. The valve sleeve and the impeller are formed of a one piece construction, thereby reducing the number of components in the controller.

Another object of the invention is to provide a plug for the controller having a fluid outlet opening and which supports an integral valve tube on which the valve sleeve is slidably mounted.

The plug is threadably mounted in the controller body. A problem with a conventional plug construction is that the threads connecting the plug to the body tend to become slightly cocked.

The inventive plug is screwed in a threaded opening in the controller body which has a pair of spaced cylindrical guide surfaces, one on each side of the threads that engage the plug. The plug has a pair of cylindrical guide surfaces that slidably and tightly mate with the guide surfaces of the controller body. One guide surface is on one side of the threads, the other guide surface on the other side of the threads. The two guide surfaces ensure that the valve tube is centrally located in the impeller chamber. This permits the valve tube to be made as an integral extension of the plug.

The controller body has a stepped internal construction from the fluid inlet at one end to the plug opening at the opposite end, that is, each internal diameter of the body gradually increases from one end to the opposite end. This permits the controller body to be machined from a one-piece casting. It also keeps the impeller centered in the body on the same axis as the center of the valve tube.

Still further objects and advantages of the invention will become readily apparent to those skilled in the art to which the invention pertains upon reference to the following description of the preferred embodiment.

DESCRIPTION OF THE DRAWING

The description refers to the accompanying drawings in which like reference characters refer to like parts throughout the several views, and in which.

DESCRIPTION OF THE PREFERRED EMBODIMENT

Figure 1:
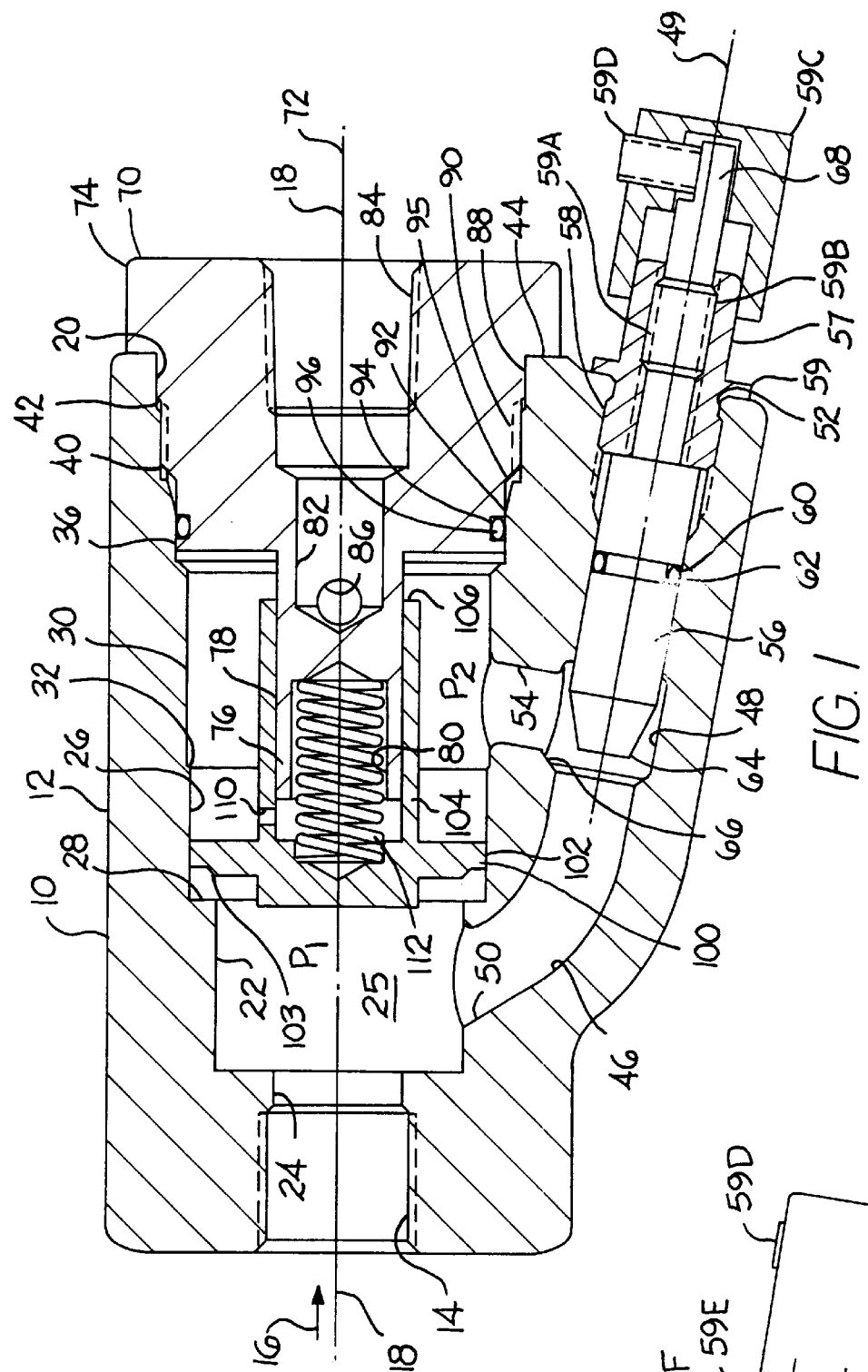
FIG. 1 is a longitudinal sectional view of a flow rate controller illustrating the invention.
Figure 4:
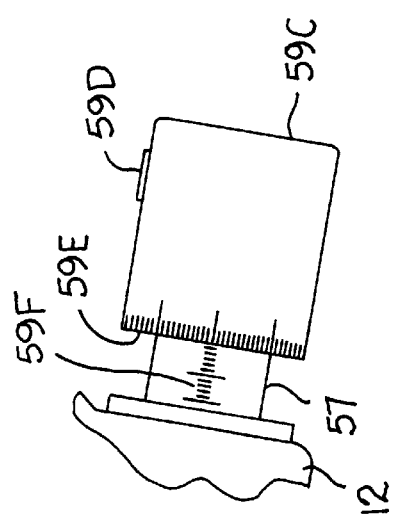
FIG. 4 is an enlarged view of the micrometer head end of the valve.

Referring to the drawing, FIG. 1 illustrates a preferred flow rate controller 10 which comprises a cast alloy steel body 12, having a threaded inlet opening 14 for receiving fluid in the direction of arrow 16 along what will be referred to as a flow axis 18. Axis 18 is an imaginary centerline of the body interior bore. Body 12 has a plug opening 20 at its opposite end, also formed about flow axis 18.

Body 12 has an internal chamber 22 fluidly connected with inlet opening 14 through short cylindrical passage 24. Chamber 22 has several progressively enlarged cylindrical areas, all formed generally symmetrically about flow axis 18.

Chamber 22 includes a cylindrical high pressure area 25 which merges with an impeller chamber 26 which has a larger cylindrical diameter and defines an annular step 28. The chamber is enlarged at 30 to define a second annular step 32. The chamber then is further enlarged to form plug opening 20. The plug opening includes a cylindrical guide surface 36. A helical threaded section 40 is disposed adjacent cylindrical guide surface 36. The plug opening has a second cylindrical guide surface 42 formed around axis 18 adjacent the threaded section. Guide surface 42 has a larger diameter than guide surface 36. Both guide surfaces are aligned along axis 18. The plug opening terminates with an annular abutment 44. The controller body also has a lateral passage 46 that curves toward a linear valve passage 48 that is disposed along an axis 49 that lies at an acute angle with respect to axis 18. The valve passage is also gradually enlarged from its inlet opening 50 toward an opening 52 at its opposite end. A lateral passage 54 connects the valve passage to impeller chamber 26.

An elongated valve 56 is slidably mounted in the valve passage. A flanged sleeve 57 is mounted at the outer end of the valve passage. Sleeve 57 is connected by threaded means 58 to the body and tightened until flange 59 abuts the outer end of the valve passage. The sleeve is internally threaded at 59A.

The valve has an externally threaded section at 59B meshed with threaded section 59A. Turning the valve in one direction advances the valve toward the end of passage 46 while turning the valve in the opposite direction moves the valve in the opposite direction.

A micrometer head 59C having a cylindrical skirt is mounted on the outer end of the valve and overlaps sleeve 57. A set screw 59D fastens head 59C to the valve so they rotate as a unit.

The micrometer head and sleeve 57 have matching indicia 59D and 59F which are aligned according to the desired flow rate.

The midsection of the valve has an annular groove 60. An O-ring seal 62 in groove 60 provides a sealed sliding fit between the valve and the valve passage to prevent fluid leakage from the controller body. The inner end of the valve has a tapered point 64 which defines the size of an adjustable orifice 66. Orifice 66 passes fluid from the inlet opening and a high pressure $P_1$ area, through passages 46 and 54 into the impeller chamber and a low pressure $P_2$ area. The orifice size defines the rate of flow from the high pressure area to the low pressure area. The rate of flow is adjusted by relocating the point of the valve.

A stainless steel plug 70 is mounted in opening 20 of the controller body. The plug is formed substantially symmetrical about a plug axis 72 that coincides with flow axis 18 when the plug is located in the plug opening by the cylindrical guide surfaces.

The plug has an enlarged head 74 that seats against abutment 44 of the controller body. The opposite end of the plug carries an integral valve tube 76 that is also formed along plug axis 72. The outer surface 78 of the valve tube is cylindrical. The valve tube has an internal cylindrical spring pocket 80.

Figure 3:
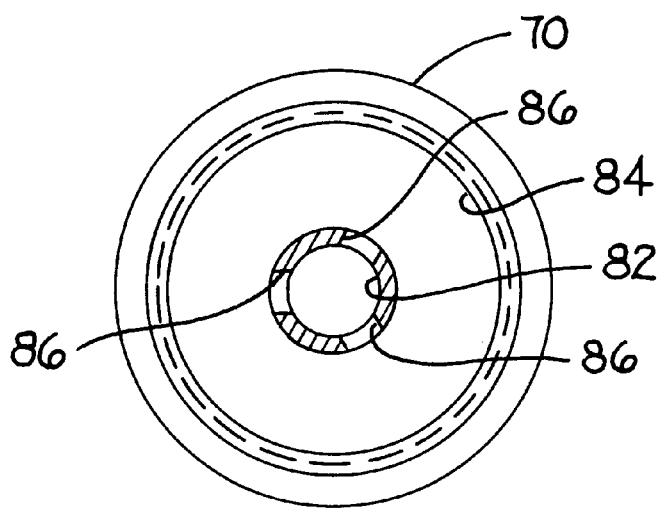
FIG. 3 is a sectional view of the plug, taken in a plane passing through the ports in the valve tube.

The plug has a cylindrical bore 82 which extends from a tapered inner end along the axis of the plug to the plug's outer face. Bore 82 is enlarged to form a threaded outlet or fluid discharge opening 84 adapted to connect the controller to a conduit fitting (not shown). The opposite end of bore 82 is narrower than threaded opening 84 and, as shown in FIGS. 1 and 3, has three equi-angularly spaced port means 86. Port means 86 provide fluid communication between bore 82 and the low pressure area of the impeller chamber.

The plug has a cylindrical guide surface 88 formed around the plug axis and which tightly engages guide surface 42 of the plug opening.

The plug has a helical threaded section 90 formed along the plug axis and which engages threaded section 40 of the plug opening when the head of the plug engages abutment 44. The plug has a second cylindrical guide surface 92 also formed about plug axis 72 and which slideably tightly engages cylindrical guide surface 36 of plug opening 20. The two cylindrical guide surfaces are machined to precisely align the longitudinal turning axis of the plug with the axis of the controller body, and the axis of the cylindrical wall of the impeller chamber. This alignment precisely locates the valve tube in the impeller valve chamber, permitting the valve tube to form an integral part of plug 70.

The plug also has an annular groove 94 supporting an O-ring sealing member 96 which engages guide surface 36 to prevent leakage between the plug and the controller body. The plug has an annular chamfered section 95 connecting threaded section 90 and guide surface 92. The chamfered section and the guide surface 92 permit the O-ring sealing member to be installed into the plug without contacting threaded section 40.

A disc-shaped impeller 100 is mounted in the impeller valve chamber. The impeller has a peripheral edge 102 which slideably engages the cylindrical wall of the impeller chamber. Edge 102 is formed with a curved surface which forms part of an imaginary sphere to prevent the impeller from becoming cocked in the impeller chamber and to prevent galling.

The impeller has a frusto-conical section 103 which engages step 28 when the impeller is in its fully open position, that is, its closest location with respect to the inlet opening. The impeller is located so that its side facing the inlet opening is exposed to the high pressure fluid, and its opposite side is exposed to the low pressure fluid, that is fluid whose pressure has been reduced by orifice 66.

The impeller carries an integral valve sleeve 104 which is slideably mounted on valve tube 76. The valve sleeve has a length sufficient to partially cover port means 86 in the valve tube depending upon the position of the impeller. In its extreme open position, the lower edge 106 of the sleeve does not obstruct fluid flow through port. means 86. As the impeller is moved toward the plug, lower sleeve edge 106 partially covers the valve ports to ensure a constant fluid flow rate discharging from the controller. Preferably the valve sleeve covers at least fifty-percent of the diameter of the valve ports.

Figure 2:
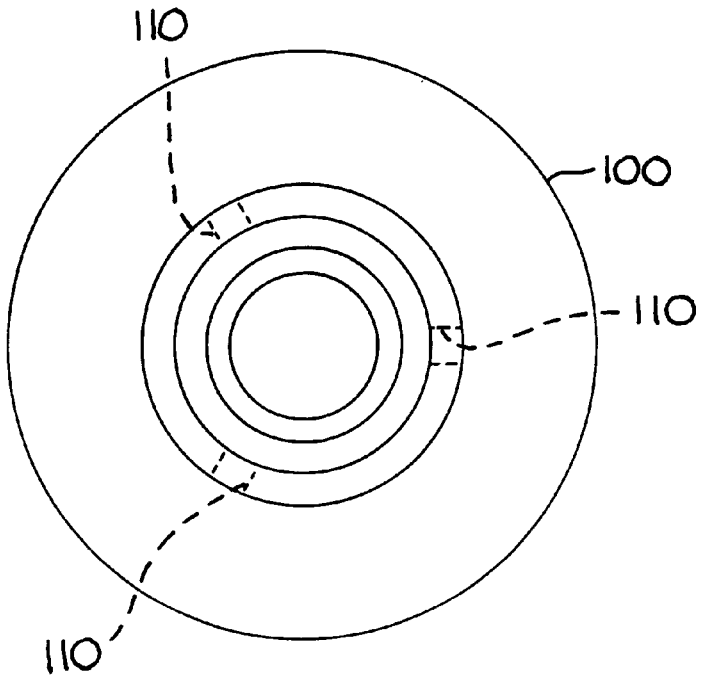
FIG. 2 is a view of the impeller as seen from the high pressure side.

The valve sleeve has three equi-angularly spaced port means 110, best shown in FIGS. 1 and 2, which permit passage of fluid from the low pressure side of the impeller chamber into spring chamber 80 so that fluid can flow into and out of the spring chamber as the valve sleeve slides along the valve tube. It is imperative that all surfaces of the impeller and the valve sleeve parallel to flow axis 18 and exposed to $P_2$ equal the surfaces parallel to flow axis 18 and exposed to $P_1$. These same surfaces are not affected by $P_3$.

A helical compression spring 112 is disposed in the spring chamber to bias the impeller toward the inlet opening.

OPERATION

In operation, inlet fluid at pressure $P_1$ enters through inlet opening 14 from a conduit and a suitable fitting, not shown. The fluid passes into the high pressure side of the chamber, passes through passage 46, orifice 66, and passage 54 to the low pressure side of the impeller. The fluid then passes through that portion of ports 86, not blocked by the valve sleeve, and through outlet bore 82.

The pressure of the fluid passing through orifice 66 is reduced to a level $P_2$ so that the impeller is exposed to a pressure differential between pressure $P_2$ on the low pressure side of the impeller and pressure $P_1$ on the high pressure side of the impeller. The fluid pressure is further reduced as it passes through port means 86 to a pressure $P_3$.

The location of the impeller along the valve tube is a function of the differential pressure on the high $P_1$ and low $P_2$ pressure sides of the impeller and the force of spring 112. The valve does not, however, operate independently of varying outlet pressures $P_3$ which are downstream of valve ports 86. Flow is a function of differential pressure. As $P_3$ increases, the rate of flow through ports 86 must decrease and thereby increase the pressure of $P_2$, which creates an imbalance on the impeller which moves the valve sleeve toward opening 14 increasing the size of ports 86 which then increases the flow through ports 86 and returning stability.

In response to an increase in inlet pressure $P_1$, acting on the high pressure side of the impeller, the impeller moves against the compression spring to slightly close port means 86 to maintain the same fluid flow rate which maintains the predetermined differential pressure.

In response to a reduction in pressure $P_1$ the impeller moves toward the inlet opening under the bias of the compression spring thereby opening port means 86 a sufficient amount to maintain the outlet flow rate constant.

The guide means in the plug opening and on the plug ensure that the valve tube is located such that the impeller precisely engages the wall of the impeller chamber. This permits the impeller and the sleeve to be made of a one-piece construction.

Having described our invention we claim:

1. In a fluid flow controller having a body with an internal impeller chamber having a cylindrical wall formed about an axis, an inlet opening for receiving fluid under pressure into the impeller chamber, outlet opening means for discharging fluid from the impeller chamber, and valve means disposed in the impeller chamber for passing fluid from the inlet opening to the outlet opening means; the improvement comprising:

the outlet opening means including a plug having a fluid discharge passage;

the plug having threaded means for connecting the plug to the body by turning the plug about a plug turning axis;

annular guide means disposed between the plug and the body for aligning the plug in a predetermined position with respect to the impeller chamber as the plug is threadably connected to the body by turning the plug about said plug turning axis;

a second valve (56) mounted in the body for controlling the rate of flow of fluid from the inlet opening to the outlet opening means, and including micrometer means mounted on the second valve and the body for precisely adjusting said rate of fluid flow.

2. In a fluid flow controller in a body with an internal impeller chamber having a cylindrical wall formed about an axis, an inlet opening for receiving fluid under pressure into the impeller chamber, outlet opening means for discharging fluid from the impeller chamber and valve means disposed in the impeller chamber for passing fluid from the inlet opening to the outlet opening means, the improvement comprising:

the outlet opening means including the body having a plug-receiving opening (20), the plug-receiving opening having a first cylindrical guide surface (36) formed about an axis (18) and having a first diameter, annular internal threaded means formed about said axis (18) adjacent said first cylindrical guide surface, and a second cylindrical guide surface (42) formed about said axis (18) adjacent said threaded means but being axially spaced from the first cylindrical guide surface and on the opposite side of the threaded means as the first cylindrical guide surface, the second cylindrical guide surface having a greater diameter than the first cylindrical guide surface;

a plug receivable in the plug-receiving opening and having a central axial opening for passing fluid from said chamber, the plug having external threaded means engageable with the internal threaded means of the plug-receiving opening for connecting the plug to the body as the plug is being received in said plug-receiving opening, the plug having a first cylindrical guide surface slideably engageable with the first cylindrical guide surface of the plug-receiving opening, the plug having a second cylindrical guide surface slideable engageable with the second cylindrical guide surface of the plug-receiving opening, and on the opposite side of the plug threaded means as the first cylindrical guide surface of the plug whereby the first and second cylindrical guide surfaces of the plug slideably engage the first and second cylindrical guide surfaces of the plug-receiving opening to precisely locate the plug as it is being turned into the plug-receiving opening as the threaded means on the plug engage the threaded means of the plug-receiving opening.

3. The improvement as defined in claim 2, in which the impeller chamber has a cylindrical axis and including a valve tube disposed in said impeller chamber, an impeller sleeve being mounted on the valve tube so as to be moveable therealong, and the valve tube being attached to the plug, the valve tube having a longitudinal axis aligned with the axis of the impeller chamber.

4. The improvement as defined in claim 3, including an orifice opening disposed in the flow path of the fluid from the inlet opening to the outlet opening means, and in which a valve 56 has a tapered end 64 for precisely adjusting the size of the orifice opening and thereby the flow rate of fluid through the controller body.

5. The improvement as defined in claim 3, in which the valve means includes the sleeve impeller being slidably mounted on the valve tube for opening or closing fluid flow from the impeller chamber and the impeller being integrally attached to the sleeve.

6. The improvement as defined in claim 4, in which the impeller has an annular peripheral edge slidably engageable with the impeller chamber wall, said peripheral edge being formed with a curved surface forming a part of an imaginary spherical surface.

7. The improvement as defined in claim 4, in which the inlet opening and the outlet opening means are formed along a common axis.

8. The improvement as defined in claim 2, including an annular seal carried on the plug for engaging the guide means, the outlet opening has an annular chamfered shoulder having a diameter less than the diameter of the threaded, whereby the annular seal can be received into the plug opening without engaging the threaded means.

* * * * *